United States Patent
Davidson

(10) Patent No.: US 9,488,548 B2
(45) Date of Patent: Nov. 8, 2016

(54) APPARATUS AND METHOD FOR TESTING AN AIRBAG CONTROL UNIT

(71) Applicant: Robert Bosch GmbH, Stuttgart (DE)

(72) Inventor: Phillip K. Davidson, Howell, MI (US)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 14/537,410

(22) Filed: Nov. 10, 2014

(65) Prior Publication Data

US 2016/0131556 A1    May 12, 2016

(51) Int. Cl.
*G01M 7/08* (2006.01)
*B60R 21/16* (2006.01)
*G01M 99/00* (2011.01)

(52) U.S. Cl.
CPC .............. *G01M 7/08* (2013.01); *B60R 21/16* (2013.01); *G01M 99/008* (2013.01)

(58) Field of Classification Search
CPC ............... G01M 7/08; G01M 99/008; B60R 2021/01286; B60R 2021/01184; B60R 21/16
See application file for complete search history.

(56) References Cited

U.S. PATENT DOCUMENTS

| | | |
|---|---|---|
| 3,368,308 A | 2/1968 | Physioc, III |
| 3,785,105 A | 1/1974 | Freeman |
| 4,164,104 A | 8/1979 | Carpenter et al. |
| 4,395,851 A | 8/1983 | Watts |
| 4,563,999 A | 1/1986 | Miehlich |
| 5,024,028 A | 6/1991 | Pierce et al. |
| 5,584,748 A | 12/1996 | Flynn et al. |
| 5,786,526 A | 7/1998 | Byon |
| 5,938,509 A | 8/1999 | Fox et al. |
| 6,422,071 B1 | 7/2002 | Heil et al. |
| 6,427,675 B1 | 8/2002 | Caldwell et al. |
| 6,679,095 B1 | 1/2004 | Grossman et al. |
| 6,981,910 B1 | 1/2006 | Goff |
| 7,445,003 B2 | 11/2008 | Smith |
| 7,823,574 B2 | 11/2010 | Chu |
| 8,043,141 B1 * | 10/2011 | Goff ........................ B24C 5/062 451/38 |
| 8,550,881 B2 | 10/2013 | Loutzenheiser et al. |
| 8,571,760 B2 | 10/2013 | You et al. |
| 8,702,476 B2 | 4/2014 | Ito et al. |

FOREIGN PATENT DOCUMENTS

| | | | |
|---|---|---|---|
| DE | 4143007 A1 * | 7/1993 | ............. B60R 21/16 |
| JP | 08323629 A * | 12/1996 | |
| JP | 09061303 A * | 3/1997 | |

OTHER PUBLICATIONS

Qinggong, "Stone and Concrete Blocks Shot Blasting Machine," <http://www.shotblastpro.com/stone-and-concrete-blocks-shot-blasting-machine/> posted May 4, 2013.
Foundry Lexicon, "Manipulator blasting machines," <http://www.giessereilexikon.com/en/foundry-lexicon/?tx_contagged%5bsource%5d=default&tx_contagged%5buid%5d=4264&cHash=eb7541cc845f7eb16090521c22b168df> available as early as Aug. 8, 2014.

\* cited by examiner

*Primary Examiner* — Daniel J Colilla
(74) *Attorney, Agent, or Firm* — Michael Best & Friedrich LLP

(57) ABSTRACT

An apparatus for testing a vehicle airbag ECU is provided. The apparatus includes a support plate having a first surface for mounting the airbag ECU and a wheel rotatable about a rotational axis. An input chute is positioned above the wheel and configured to direct an aggregate to the wheel. A motor is connected to a power supply and drivingly connected to the wheel. A controller is programmed to operate the motor and to selectively vary a rotational speed of the motor and the wheel. The wheel is configured to project the aggregate to impact a second surface of the support plate that is opposite the first surface.

20 Claims, 2 Drawing Sheets

APPARATUS AND METHOD FOR TESTING AN AIRBAG CONTROL UNIT

BACKGROUND OF THE INVENTION

Vehicles are equipped with standard safety features such as seat belts and airbags. In an effort to provide increased safety to the driver and passengers within the vehicle in any traffic collision or automotive accident, automotive manufacturers have produced vehicles with multiple airbags located throughout the cabin (e.g., passenger airbags, side airbags, curtain airbags, etc.) to protect the occupants in various crash scenarios. All of the airbags within a vehicle are controlled by an electronic control unit for an airbag (i.e., airbag ECU) which detects and evaluates a crash before deploying the necessary airbags dependent upon the location and severity of the crash. The airbag ECU receives input from various crash sensors (e.g., acceleration sensors, pressure sensors) located about the vehicle. Once the airbag ECU determines that a crash has occurred, an inflator system fills up the airbag with a gas such as nitrogen.

Airbag ECUs are typically located on a floor panel or underbody panel of a vehicle and can experience impacts from debris that is kicked up from the environment, such as dirt or rocks. Various tests are conducted within vehicles and over multiple road and off-road terrains to verify that the impacts experienced by the airbag ECUs do not disrupt or cease functionality of said units.

SUMMARY OF THE INVENTION

The invention provides, in one aspect, an apparatus for testing a vehicle airbag ECU. The apparatus includes a support plate having a first surface for mounting the airbag ECU, and a wheel rotatable about a rotational axis. An input chute is positioned above the wheel and configured to direct an aggregate to the wheel. A motor is connected to a power supply and drivingly connected to the wheel. A controller is programmed to operate the motor and to selectively vary a rotational speed of the motor and the wheel. The wheel is configured to project an aggregate to impact a second surface of the support plate that is opposite the first surface.

The invention provides, in another aspect, a method for testing an airbag ECU. A support plate is provided with a first surface and a second surface. An airbag ECU is mounted to the first surface of the support plate. A wheel is provided having a rotational axis. The wheel is rotated with the motor. The motor is controlled with a controller to set a rotational speed of the wheel. An aggregate is introduced to the wheel, which in turn throws the aggregate at the second surface of the support plate. An electric output signal of the airbag ECU is monitored.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
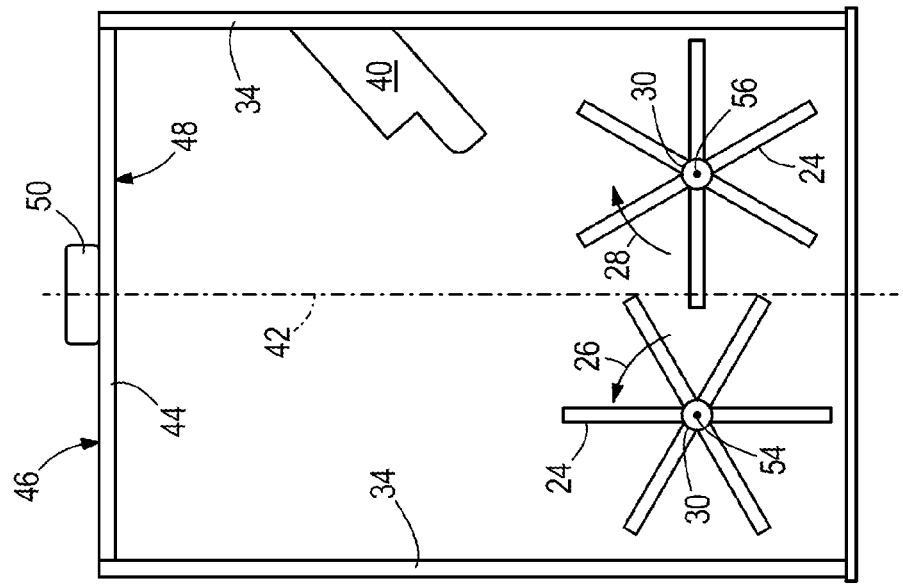
FIG. 1 is a partial front view of an apparatus for testing an airbag ECU.
Figure 3:
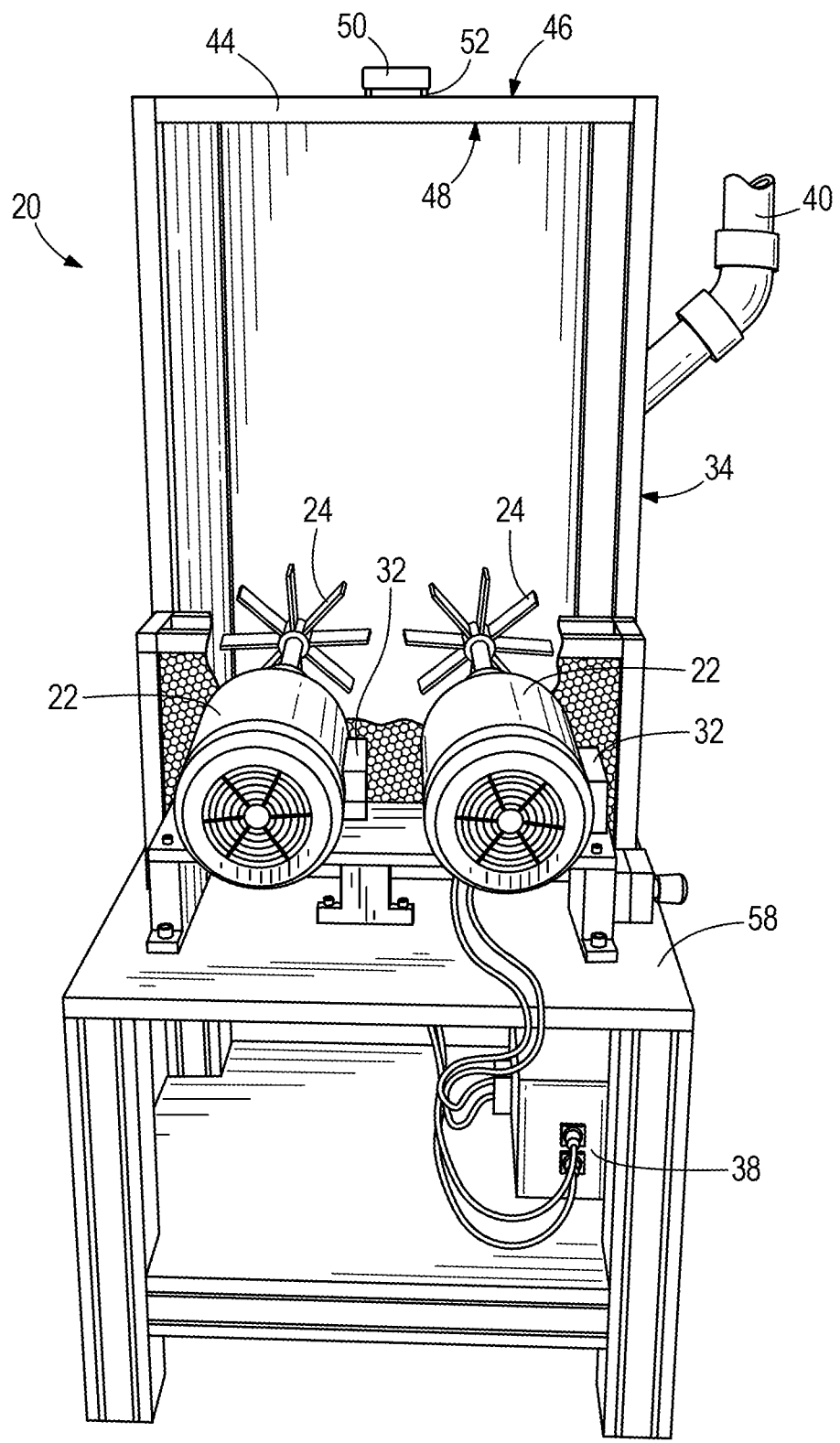
FIG. 3 is a perspective view of the apparatus of FIGS. 1-2.

FIG. 1 illustrates an apparatus 20 for testing an airbag ECU 50. As described in further detail below, the apparatus 20 supports the airbag ECU 50 and subjects the airbag ECU 50 to shock from repetitive projectiles. A support plate 44, which at least partially defines an enclosure 34, is provided with a first surface 46 and a second surface 48 generally opposite the first surface 46. The support plate 44 simulates an underbody panel of a vehicle and may be made of an appropriate metal or plastic material. Alternatively, the support plate 44 can be an underbody panel, or a portion thereof, of a vehicle. The airbag ECU 50 is attached (e.g., with screws) to the first surface 46 of the support plate 44, either directly as shown in FIG. 1, or offset from the first surface 46 with a plurality of standoffs 52, as shown in FIG. 3. The first surface 46 can be oriented to face in an upward direction, to mimic the orientation of the airbag ECU 50 mounting within a vehicle. The support plate 44 can provide multiple different mounting positions for the airbag ECU 50.

The apparatus 20 includes at least one wheel configured to project material at the second surface 48 of the support plate 44. For example, as shown in FIG. 1, two wheels 24 are located below the second surface 48 of the support plate 44. Each wheel 24 is located on a shaft 30, centered about a rotational axis 54, 56. The wheel 24 shown on the left in FIG. 1 is centered about a first rotational axis 54 and rotates in a first rotational direction indicated by arrow 26. The wheel 24 shown on the right in FIG. 1 is centered about a second rotational axis 56 and rotates in a second rotational direction indicated by arrow 28, opposite the first rotational direction. In other constructions, more or fewer wheels 24 can be provided. It should be noted that the wheel(s) 24 can be round and rotated continuously, but may also be non-round and may be moved in other ways to launch projectiles at the support plate 44 in other constructions.

The wheels 24 can be embodied as general automotive wheels with tires (i.e., rubber tread), paddle wheels, or any other suitable wheel type. In some constructions, the wheels 24 are paddle wheels (FIG. 3). A paddle wheel can include a circular frame supporting a plurality of paddles extending radially with respect to the rotational axes 54, 56. Radially extending can refer to the paddles extending purely in a radial direction, or that the paddles extend with a radial component, which may be a majority component. For example, the paddles can be straight but slanted from a true radius, or may be curved, or have another non-linear shape. Embodied as paddle wheels, the wheels 24 may have outer profiles that overlap or intersect with one another such that the paddles of the two wheels 24 are interwoven and a distance from the first rotational axis 54 to the second rotational axis 56 is less than the diameter of either of the wheels. Alternately, the wheels 24 can be located tangent to one another, or nearly tangent (i.e., having a small space between the respective outer profiles). The wheels 24 can be equal in size and placed at a common height such that the first rotational axis 54 and the second rotational axis 56 lie in a plane parallel to the first surface 46. Additionally, a point midway between the axes 54, 56 of the two wheels 24 is located along a central axis 42 along which the airbag ECU 50 is also positioned. The central axis 42 is perpendicular to the first surface 46 of the support plate 44. Placed in this orientation, when aggregate is introduced to the wheels 24 through an input chute 40, the aggregate is thrown at the second surface 48 of the support plate 44, which mimics rocks and debris contacting the underbody of a vehicle. The aggregate can be any material (e.g. gravel, crushed stone, slag, crushed concrete) capable of simulating road or off-road debris encountered by a vehicle having the airbag ECU 50.

The input chute 40 extends through a sidewall of the enclosure 34. The input chute 40 can be located in any position to provide the aggregate to the wheels 24 and can be embodied as an orifice, a tubular or open slide inlet, or any other suitable structure for introducing the aggregate into the enclosure 34. As shown, the input chute 40 introduces the aggregate to the wheels 24 from above such that the aggregate can be gravity fed to the wheels 24. Alternatively, the aggregate can be introduced to the wheels 24 through a driven input system having for example, pressurized air, a conveyor, or another suitable means of delivering the aggregate to the wheels 24. In some constructions, the input chute 40 is located below the wheels 24 and is configured to deliver the aggregate in an upward direction towards a nip or pinch point along the central axis 42 where the wheels 24 are closest to one another or have maximum overlap. This technique may be used in combination with wheels 24 that are provided with tires of rubber or another material which operates on the aggregate based on friction to grab, pinch, and/or throw the aggregate.

Figure 2:
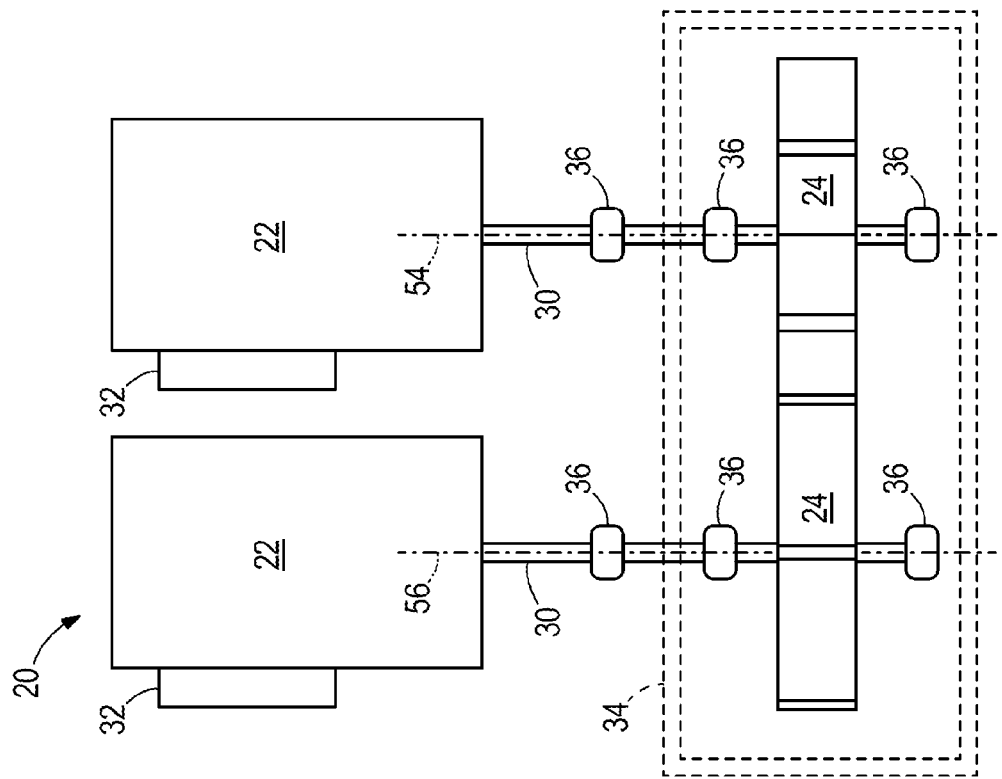
FIG. 2 is a partial top view of the apparatus of FIG. 1.

With reference to FIG. 2, the support plate 44 and the input chute 40 are removed for clarity. The wheels 24 are located within the enclosure 34. This allows for containment of the aggregate. The enclosure 34 surrounds the wheels 24 on all four lateral sides and is capped by the support plate 44 above and a base 58 located below the wheels 24. The enclosure 34 can be made of one or more materials capable of withstanding the impact of the aggregate (e.g., aluminum, steel, engineering plastics). To enable viewing the test from outside the enclosure 34, an observation device (e.g., a transparent or translucent section, a video camera and screen) can be provided as part of the enclosure 34 or in addition thereto.

The wheels 24 are fixed to the shafts 30 and are centered on the first and second rotational axes 54, 56. The wheels 24 are supported by a plurality of bearings 36 located along the length of the shafts 30. The bearings 36 can be located within mounting brackets (not shown) and may be shielded to prevent damage to the bearings 36 from contact with the aggregate. The shaft 30 may be embodied as the output shaft of a motor 22, or it may be coupled to the output shaft of a motor 22, such that when the motor 22 is energized, the shaft 30 rotates. One or more motors 22 may be used to rotate the wheels 24. For example, each wheel 24 may be driven by a corresponding dedicated motor. Alternatively, one motor may be used (e.g., through gearing, pulleys, frictional contact, etc.) to rotate multiple wheels 24 in opposing directions.

In some embodiments, the apparatus includes a controller 32, and the speed of the motor(s) 22 is regulated with the controller 32. The controller 32 is capable of regulating various aspects of a test such as the speeds at which the motors 22 and wheels 24 rotate and the duration of a test. As shown, each motor 22 can be regulated by a separate controller 32. Alternatively, one controller 32 can be used to control all of the motors 22. The controller 32 can be programmed to run a specific test, or can be manually controlled by an operator to provide real time control in response to operator input. The motors 22 are connected to a power supply 38 which selectively energizes the motors 22, depending on input from the controllers 32.

As shown in FIG. 3, the enclosure 34 can include an extruded aluminum frame with sheet metal (e.g., stainless steel, aluminum) walls and at least one non-opaque (e.g., clear PMMA, polycarbonate) wall to enable visibility of the test chamber within the enclosure 34 from a position outside the enclosure 34. As shown in FIG. 3, the motors 22 and the enclosure 34 can be supported above the ground by the base 58.

In operation, testing begins by mounting the airbag ECU 50 to the first surface 46 of the support plate 44. Once the airbag ECU 50 is properly wired and capable of producing one or more electrical output signals, the motors 22, energized by the power supply 38 and regulated by the respective controllers 32, rotate the wheels 24 at a desired speed. The aggregate is fed through the input chute 40 into the enclosure 34 and contacts the rotating wheels 24. When the aggregate contacts the rotating wheels 24, which are spinning in opposite directions, the aggregate is thrown at the second surface 48 of the support plate 44. The rotating wheels 24 project aggregate toward the support plate 44 to simulate a wheel of a vehicle projecting gravel or rocks at the underbody of the vehicle. A target impact strength and a target impact frequency can be determined prior to, or during, the test, and can be modified at any point during the test. The variability of the impact strength and frequency can model various terrains and driving conditions. The modification of the impact strength and impact frequency of the aggregate can be accomplished by varying the motor speed, by varying the aggregate supply to the wheels 24, by varying the size of the aggregate, or any combination of the aforementioned. For example, parameters such as number of particles per unit time, mass per unit time, or volume per unit time, may be varied. Alternately, or in addition, the aggregate supplied to the apparatus 20 can be varied (e.g., aggregate mass, density, particle size, etc.) to meet a particular test parameter. The output signals from the airbag ECU 50 are monitored in response to the impacts from the aggregate. This can include outputs from one or more sensors (e.g., sensing acceleration, roll, pitch, yaw, etc.) located within the airbag ECU 50 at the support plate 44. Additionally, reference accelerometers can be mounted directly to the support plate 44, similar to the mounting points of satellite accelerometers within a vehicle.

Utilizing the testing apparatus 20, as opposed to testing an airbag ECU 50 in a vehicle, not only provides more efficient results, but also provides more controllable and repeatable results. The type and size of the aggregate, representing different road or off-road conditions and geographical locations, can be changed between or during tests. The amount and size of the aggregate, as well as various environmental factors can be monitored and controlled. The speed of the motors 22, the amount and size of the aggregate, and the duration of the test can be controlled and repeated using different aggregates or different airbag ECUs 50.

Although the invention has been described in detail with reference to certain preferred embodiments, variations and modifications exist within the scope and spirit of one or more independent aspects of the invention as described.

What is claimed is:
1. An apparatus for testing a vehicle airbag ECU, the apparatus comprising:
   a support plate having a first surface for mounting the airbag ECU;
   a wheel rotatable about a rotational axis;

an input chute positioned above the wheel and configured to direct an aggregate to the wheel;

a motor connected to a power supply and drivingly connected to the wheel, wherein the wheel is configured to project the aggregate to impact a second surface of the support plate that is opposite the first surface;

a controller programmed to operate the motor and regulate various aspects of a specific test by selectively varying a rotational speed of the wheel to thereby meet a target impact strength and target impact frequency of the aggregate for the specific test of the airbag ECU.

2. The testing apparatus of claim 1, wherein the wheel is a first wheel and the rotational axis is a first rotational axis, and further comprising a second wheel rotatable about a second rotational axis parallel to the first rotational axis and positioned adjacent to the first wheel.

3. The testing apparatus of claim 2, wherein the motor is a first motor, and further comprising a second motor connected to the power supply and drivingly connected to the second wheel.

4. The testing apparatus of claim 3, further comprising a second controller programmed to operate the second motor and selectively vary a rotational speed of the second motor and the second wheel to match the rotational speed of the first motor and the first wheel.

5. The testing apparatus of claim 3, wherein the first and second motors are configured to rotate the first wheel and the second wheel in opposing directions.

6. The testing apparatus of claim 2, wherein the first wheel and the second wheel are paddle wheels each including a plurality of paddles extending radially with respect to the first rotational axis and second rotational axis respectively.

7. The testing apparatus of claim 6, wherein the distance from the first rotational axis to the second rotational axis is less than the diameter of the first wheel and less than the diameter of the second wheel.

8. The testing apparatus of claim 1, wherein the support plate at least partially defines the enclosure such that the second surface is exposed to the wheel and the airbag ECU is positioned outside the enclosure.

9. A method for testing an airbag ECU, the method comprising;

providing a support plate with a first surface and a second surface;

mounting an airbag ECU to the first surface of the support plate;

providing a wheel having a rotational axis;

rotating the wheel with a motor;

controlling a motor with a controller to set a rotational speed of the wheel;

introducing an aggregate to the wheel, which in turn throws the aggregate at the second surface of the support plate; and monitoring an electrical output signal of the airbag ECU.

10. The method of claim 9, wherein the wheel is a first wheel and the rotational axis is a first rotational axis, the method further comprising;

providing a second wheel having a second rotational axis that is parallel to the first rotational axis;

locating the second wheel adjacent the first wheel;

rotating the second wheel in a rotational direction opposite the first wheel such that the first and second wheels cooperate to jointly throw the aggregate at the second surface.

11. The method of claim 10, further comprising rotating the second wheel with a second motor.

12. The method of claim 11, further comprising selectively varying a rotational speed of the first motor and the second motor.

13. The method of claim 10, wherein the first wheel and the second wheel are paddle wheels each including a plurality of paddles extending radially about the first rotational axis and second rotational axis respectively.

14. The method of claim 10, wherein the distance from the first rotational axis to the second rotational axis is less than the diameter of the first wheel and less than the diameter of the second wheel.

15. The method of claim 10, wherein the aggregate is introduced to the first wheel and the second wheel through an input chute from above.

16. The method of claim 9, wherein the aggregate is introduced to the wheel through an input chute.

17. The method of claim 16, wherein the input chute is located above the wheel.

18. The method of claim 9, further comprising:

selecting at least one of a target impact strength or a target impact frequency; and varying the amount or size of the aggregate introduced to the wheels to meet the target impact strength and/or target impact frequency.

19. The method of claim 18, further comprising monitoring the impact strength and the frequency of the impacts of the aggregate with a sensor located at the support plate.

20. The method of claim 9, further comprising:

selecting at least one of a target impact strength or a target impact frequency; and varying a control signal to the motor to vary the rotational speed of the wheel in order to meet the target impact strength and/or target impact frequency.

* * * * *